United States Patent
Kontomaris et al.

(10) Patent No.: US 9,150,770 B2
(45) Date of Patent: *Oct. 6, 2015

(54) COMPOSITION COMPRISING CIS-1,1,1,4,4,4-HEXAFLUORO-2-BUTENE AND TRANS-1,2-DICHLOROETHYLENE, APPARATUS CONTAINING SAME AND METHODS OF PRODUCING COOLING THEREIN

(75) Inventors: Konstantinos Kontomaris, Wilmington, DE (US); Jeffrey P Knapp, Wilmington, DE (US); Joshua Hughes, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 458 days.

This patent is subject to a terminal disclaimer.

(21) Appl. No.: 13/394,420

(22) PCT Filed: Sep. 15, 2010

(86) PCT No.: PCT/US2010/048944
§ 371 (c)(1),
(2), (4) Date: Mar. 6, 2012

(87) PCT Pub. No.: WO2011/034929
PCT Pub. Date: Mar. 24, 2011

(65) Prior Publication Data
US 2012/0167599 A1    Jul. 5, 2012

Related U.S. Application Data

(60) Provisional application No. 61/242,875, filed on Sep. 16, 2009.

(51) Int. Cl.
*C09K 5/04* (2006.01)

(52) U.S. Cl.
CPC ........... *C09K 5/045* (2013.01); *C09K 2205/122* (2013.01); *C09K 2205/126* (2013.01)

(58) Field of Classification Search
CPC .............. C09K 5/044; C09K 2205/122; C09K 2205/126
See application file for complete search history.

(56) References Cited

U.S. PATENT DOCUMENTS

| | | | | |
|---|---|---|---|---|
| 5,848,538 | A * | 12/1998 | Tischer | 62/468 |
| 7,972,524 | B2 * | 7/2011 | Robin | 252/2 |
| 7,972,525 | B2 * | 7/2011 | Robin | 252/2 |
| 8,070,976 | B2 | 12/2011 | Nappa et al. | |
| 2006/0242985 | A1 | 11/2006 | Leck et al. | |
| 2006/0266975 | A1 | 11/2006 | Nappa et al. | |

(Continued)

FOREIGN PATENT DOCUMENTS

| | | |
|---|---|---|
| JP | 05-179043 A | 7/1993 |
| WO | 96/40834 A1 | 12/1996 |
| WO | 2006/102492 A1 | 9/2006 |
| WO | 2008/134061 A2 | 11/2008 |
| WO | 2009/059106 A1 | 5/2009 |
| WO | 2009/114398 A1 | 9/2009 |

OTHER PUBLICATIONS

PCT International Search Report and Written Opinion mailed Dec. 9, 2010.
Doherty et al., Conceptual Design of Distillation Systems, 2001, Chapter 5, pp. 185-186 and Chapter 8, pp. 351-359, McGraw-Hill Higher Education, A division of The McGraw-Hill Companies.
Haaf et al., Refrigeration Technology, Ullmann's Encyclopedia of Industrial Chemistry, Jul. 15, 2000, pp. 1-43, John Wiley & Sons, Inc., Weinheim.
Montzka et al., Scientific Assessment of Ozone Depletion: 2002, Controlled Substances and Other Source Gases, Chapter 1, Section 1.4.4 Ozone Depletion Potential, pp. 1.28 to 1.31, World Meteorological Organization, Geneva, Switzerland.

*Primary Examiner* — John Hardee

(57) ABSTRACT

A chiller apparatus containing a composition comprising cis-1,1,1,4,4,4-hexafluoro-2-butene and trans-1,2-dichloroethylene.

15 Claims, 2 Drawing Sheets

(56) References Cited

U.S. PATENT DOCUMENTS

| | | |
|---|---|---|
| 2007/0108403 A1 | 5/2007 | Sievert et al. |
| 2007/0203045 A1 | 8/2007 | Schweitzer et al. |
| 2007/0203046 A1* | 8/2007 | Minor et al. .................. 510/411 |
| 2008/0314073 A1 | 12/2008 | Minor |
| 2009/0012335 A1 | 1/2009 | Nappa et al. |
| 2010/0078585 A1* | 4/2010 | Robin ................ 252/2 |
| 2010/0163776 A1* | 7/2010 | Robin ................ 252/2 |

* cited by examiner

COMPOSITION COMPRISING CIS-1,1,1,4,4,4-HEXAFLUORO-2-BUTENE AND TRANS-1,2-DICHLOROETHYLENE, APPARATUS CONTAINING SAME AND METHODS OF PRODUCING COOLING THEREIN

BACKGROUND OF THE INVENTION

1. Field of the Invention

The present disclosure relates to the field of refrigerants for use in air conditioning or refrigeration equipment. In particular, the present disclosure relates to refrigerants for use in air conditioning or refrigeration equipment, especially chillers, including flooded evaporator chillers or direct expansion chillers.

2. Description of Related Art

Working fluids for various applications are being sought that have little if any environmental impact. The hydrochlorofluorocarbon (HCFC) and hydrofluorocarbon (HFC) working fluids adopted as replacements for chlorofluorocarbon (CFC) working fluids, have lower or no ozone depletion potential (ODP), but have been found to contribute to global warming. Additionally, the HCFCs will finally reach the phase out deadline set by the Montreal Protocol due to ODP. With regulations coming in force soon based on global warming potential, even the HFCs, with zero ODP will not be environmentally acceptable working fluids.

Therefore, replacements are sought for the CFCs, HCFCs, and HFCs currently in use as refrigerants, heat transfer fluids, cleaning solvents, aerosol propellants, foam blowing agents and fire extinguishing or suppression agents.

In order to serve as drop-in replacements in existing equipment, replacements must be close to or match the properties of the original working fluid for which the equipment was designed. It would be desirable to identify compositions that provide a balance of properties that will allow replacement of existing refrigerants and also to serve as refrigerants in new equipment designed for similar applications.

In searching for a replacement for 2,2-dichloro-1,1,1-trifluoroethane, (HCFC-123) and fluorotrichloromethane (CFC-11) in particular in chiller applications, it would be desirable to consider unsaturated fluorocarbons. The unsaturated fluorocarbons have zero ODP and significantly lower GWP than the existing refrigerants in use today.

SUMMARY OF THE INVENTION

It has been found that compositions comprising cis-1,1,1,4,4,4-hexafluoro-2-butene and trans-1,2-dichloroethylene provide cooling performance within the required parameters (meaning good energy efficiency and cooling capacity), and have low GWP and low ODP. Additionally, some embodiments of these compositions can be formulated to be azeotropic and azeotrope-like compositions, which provide advantages for use in chillers. Further, some embodiments of these compositions have been found to be non-flammable, which is often a requirement in the refrigeration and air conditioning industry.

Therefore, in accordance with one embodiment of the present invention, disclosed herein is air conditioning or refrigeration equipment, and in particular, a chiller apparatus containing a composition comprising 1,1,1,4,4,4-hexafluoro-2-butene and 1,2-dichloroethylene, wherein the 1,1,1,4,4,4-hexafluoro-2-butene is cis isomer or primarily cis isomer and wherein the 1,2-dichloroethylene is trans isomer or primarily trans isomer.

In another embodiment is disclosed a method for producing cooling comprising evaporating a composition comprising cis-1,1,1,4,4,4-hexafluoro-2-butene and trans-1,2-dichloroethylene in an evaporator in the vicinity of a body to be cooled, thereby producing cooling. When the cooling is produced in a chiller, a cooling medium is passed through the evaporator, thereby cooling the cooling medium, and the cooling medium is circulated from the evaporator to the vicinity of a body to be cooled. Of particular note are chillers, wherein the vapor composition is compressed in a centrifugal compressor.

In another embodiment is disclosed a method for replacing HCFC-123 or CFC-11 refrigerant in a chiller, said method comprising providing a composition comprising 1,1,1,4,4,4-hexafluoro-2-butene and 1,2-dichloroethylene to said chiller in place of said refrigerant, wherein the 1,1,1,4,4,4-hexafluoro-2-butene is cis isomer or primarily cis isomer and wherein the 1,2-dichloroethylene is trans isomer or primarily trans isomer. The chiller may comprise a centrifugal compressor.

In another embodiment is disclosed a non-flammable composition consisting essentially of 1,1,1,4,4,4-hexafluoro-2-butene and 1,2-dichloroethylene, wherein the 1,1,1,4,4,4-hexafluoro-2-butene is essentially cis-1,1,1,4,4,4-hexafluoro-2-butene, wherein the 1,2-dichloroethylene is essentially trans-1,2-dichloroethylene, and wherein the cis-1,1,1,4,4,4-hexafluoro-2-butene is present from 50 weight percent to about 60 weight percent based on the total weight of the 1,1,1,4,4,4-hexafluoro-2-butene and 1,2-dichloroethylene.

DETAILED DESCRIPTION OF THE PREFERRED EMBODIMENTS

Figure 1:
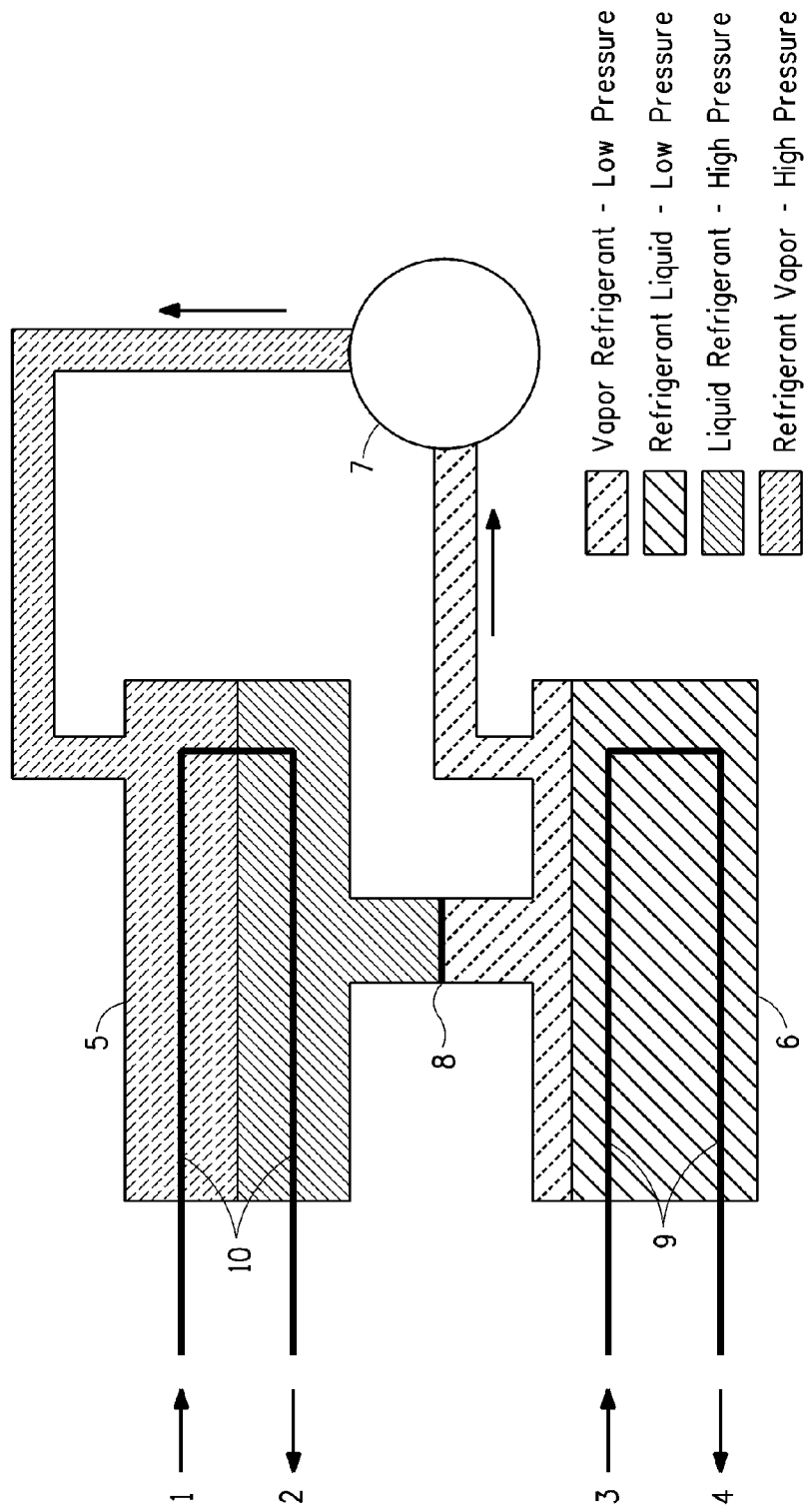
FIG. 1 is a schematic diagram of one embodiment of a flooded evaporator chiller which utilizes a composition comprising cis-1,1,1,4,4,4-hexafluoro-2-butene and trans-1,2-dichloroethylene.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the volumetric capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer system may be any refrigeration system, refrigerator, air conditioning system, air conditioner, heat pump, chiller, and the like utilizing a heat transfer composition.

As used herein, a heat transfer composition, heat transfer fluid or cooling medium comprises a composition used to carry heat from a heat source to a heat sink or to transfer cooling from a chiller to a body to be cooled.

As used herein, a refrigerant comprises a compound or mixture of compounds that function as a heat transfer composition in a cycle wherein the composition undergoes a phase change from a liquid to a vapor and back in a repeating cycle.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681-2001. The upper flammability limit ("UFL") is the maximum concentration of the heat transfer composition in air that is capable of propagating a flame through a homogeneous mixture of the composition and air as determined by ASTM E-681. As the content of the non-flammable component in a mixture comprising a flammable and a non-flammable component increases, the LFL and the UFL approach each other. When the content of the non-flammable component in the mixture reaches a critical value, the LFL and UFL of the mixture become equal. Compositions containing more of the non-flammable component than this critical value are non-flammable. For a single component refrigerant or an azeotropic refrigerant blend, the composition will not change during a leak and therefore composition change during leaks will not be a factor in determining flammability. For many refrigeration and air conditioning applications, the refrigerant or working fluid is required to be non-flammable.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (See, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is recognized that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

As used herein, an azeotrope-like composition means a composition that behaves essentially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. For the compositions described herein, compositions with a difference in dew point pressure and bubble point pressure of less than or equal to 5 percent (based upon the bubble point pressure) are considered to be azeotrope-like.

A non-azeotropic composition or a non-azeotrope-like composition is a mixture of two or more substances that behaves as a mixture rather than a single substance. One way to characterize a non-azeotropic composition is that the vapor produced by partial evaporation or distillation of the liquid has a substantially different composition from the liquid from which it was evaporated or distilled, that is, the mixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if the difference in dew point pressure and bubble point pressure is greater than or equal to 5 percent (based upon the bubble point pressure).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

The present disclosure provides methods for producing cooling in chiller systems utilizing a composition comprising cis-1,1,1,4,4,4-hexafluoro-2-butene and trans-1,2-dichloroethylene as refrigerant. This composition comprising cis-1,1,1,4,4,4-hexafluoro-2-butene and trans-1,2-dichloroethylene has been found to provide cooling performance in chillers within the required parameters (meaning good energy efficiency and reasonable cooling capacity), and to have low GWP and low ODP.

Compositions

Cis-1,1,1,4,4,4-hexafluoro-2-butene, also known as cis-HFO-1336mzz or Z—HFO-1336mzz, may be made by methods known in the art, such as described in U.S. Patent Application Publication No. US 2009/0012335 A1, by hydrodechlorination of 2,3-dichloro-1,1,1,4,4,4-hexafluoro-2-butene.

HFO-1336mzz exists as one of two configurational isomers, cis- and trans-. In samples of either "pure" isomer, there will exist some level of the other isomer. As used herein, cis-HFO-1336mzz is intended to refer to the pure cis-isomer (Z isomer) and any mixture of the two configurational isomers that is primarily cis-HFO-1336mzz, with the majority of the remainder of the composition comprising trans-HFO-1336mzz (E isomer). By a mixture that is primarily cis-HFO-1336mzz is meant a mixture of cis-HFO-1336mzz and trans-HFO-1336mzz, wherein the cis-HFO-1336mzz is present as at least 50 weight percent of the composition. Of particular note, is HFO-1336mzz that is essentially the cis isomer, such that it functions in chiller system applications equivalently or substantially equivalently to the pure cis isomer.

Trans-1,2-dichloroethylene, also known as trans-1,2-DCE, is available from numerous chemical suppliers, e.g. Sigma-Aldrich Corp. (St. Louis, Mo., USA). Trans-1,2-DCE is one of two isomers of 1,2-dichloroethylene and may contain some amount of the other isomer, cis-1,2-dichloroethylene. As used herein, by trans-1,2-dichloroethylene is meant a composition that is at least 50 weight percent trans-1,2-dichloroethylene, but may also contain cis-1,2-dichloroethylene as well. Of particular note, is 1,2-dichloroethylene that is essentially the trans isomer, such that it functions in chiller system applications equivalently or substantially equivalently to the pure trans isomer.

In one embodiment, compositions for use in air conditioning or refrigeration equipment, comprise cis-HFO-1336mzz and trans-1,2-dichloroethylene. In a particular embodiment, the equipment may be chillers, either flooded evaporator or direct expansion chillers. In another embodiment, the compositions comprise cis-HFO-1336mzz and trans-1,2-dichloroethylene, wherein the composition is at least 10 weight percent cis-HFO-1336mzz. In another embodiment, the compositions comprise cis-HFO-1336mzz and trans-1,2-dichloroethylene, wherein the composition is greater than 50 weight percent cis-HFO-1336mzz. In another embodiment, the compositions comprise cis-HFO-1336mzz and trans-1,2-dichloroethylene, wherein the composition is greater than 57.5 weight percent cis-HFO-1336mzz. Of particular note are compositions consisting essentially of 1,1,1,4,4,4-hexafluoro-2-butene (HFO-1336mzz) and 1,2-dichloroethylene, wherein the 1,1,1,4,4,4-hexafluoro-2-butene is essentially cis-1,1,1,4,4,4-hexafluoro-2-butene, wherein the 1,2-dichloroethylene is essentially trans-1,2-dichloroethylene and wherein the cis-1,1,1,4,4,4-hexafluoro-2-butene is present from 50 weight percent to about 60 weight percent based on the total weight of the 1,1,1,4,4,4-hexafluoro-2-butene and 1,2-dichloroethylene.

In some embodiments, the compositions comprising cis-HFO-1336mzz and trans-1,2-dichloroethylene useful in air conditioning or refrigeration equipment, especially chillers, either flooded evaporator or direct expansion chillers, are azeotropic or azeotrope-like. In one embodiment, azeotropic and azeotrope-like compositions are particularly useful in flooded evaporator chillers.

In one embodiment, the azeotropic or azeotrope-like compositions comprise from about 55 weight percent to about 99 weight percent cis-HFO-1336mzz and from about 45 weight percent to about 1 weight percent trans-1,2-dichloroethylene. In another embodiment, the azeotropic or azeotrope-like compositions comprise from about 67 weight percent to about 99 weight percent cis-HFO-1336mzz and from about 33 weight percent to about 1 weight percent trans-1,2-dichloroethylene. In another embodiment, the azeotropic or azeotrope-like compositions comprise from about 67 weight percent to about 87 weight percent cis-HFO-1336mzz and from about 33 weight percent to about 13 weight percent trans-1,2-dichloroethylene.

In some embodiments, the compositions comprising cis-HFO-1336mzz and trans-1,2-dichloroethylene are non-flammable. In one embodiment, the compositions comprising cis-HFO-1336mzz and trans-1,2-dichloroethylene useful in chillers are non-flammable compositions comprising greater than 50 weight percent cis-HFO-1336mzz. In another embodiment, the non-flammable compositions that are useful in chillers comprise greater than 57.5 weight percent cis-HFO-1336mzz. In another embodiment, the non-flammable compositions that are useful in chillers comprise from about 50 weight percent to about 99 weight percent cis-HFO-1336mzz and from about 50 weight percent to about 1 weight percent trans-1,2-dichloroethylene. In another embodiment, the compositions useful in chillers are non-flammable compositions comprising from about 58 weight percent to about 99 weight percent cis-HFO-1336mzz and from about 42 weight percent to about 1 weight percent trans-1,2-dichloroethylene.

In one embodiment, the compositions comprising cis-HFO-1336mzz and trans-1,2-DCE as disclosed herein may be used in combination with a desiccant in a refrigeration or air-conditioning equipment (including chillers), to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.).

In one embodiment, the compositions comprising cis-HFO-1336mzz and trans-1,2-DCE as disclosed herein may be used in combination with at least one lubricant selected from the group consisting of polyalkylene glycols, polyol esters, polyvinylethers, mineral oils, alkylbenzenes, synthetic paraffins, synthetic naphthenes, and poly(alpha)olefins.

In some embodiments, lubricants useful in combination with the compositions as disclosed herein may comprise those suitable for use with refrigeration or air-conditioning apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e.

cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In other embodiments, lubricants may also comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants used with the composition comprising cis-HFO-1336mzz and trans-1,2-DCE are selected by considering a given compressor's requirements and the environment to which the lubricant will be exposed.

In one embodiment, the compositions comprising cis-HFO-1336mzz and trans-1,2-DCE as disclosed herein may further comprise an additive selected from the group consisting of compatibilizers, UV dyes, solubilizing agents, tracers, stabilizers, perfluoropolyethers (PFPE), and functionalized perfluoropolyethers.

In one embodiment, the compositions may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration or air-conditioning system additives may be added, as desired, to the compositions comprising cis-HFO-1336mzz and trans-1,2-DCE in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis(benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In other embodiments, additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and isodecyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltri-ethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

In one embodiment, ionic liquid stabilizers comprise at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and $F-$. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In one embodiment, the composition comprising cis-HFO-1336mzz and trans-1,2-DCE as disclosed herein may be used with a perfluoropolyether additive. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". For example, a perfluoropolyether, having the formula of CF3-(CF2)2-O—[CF(CF3)-CF2-O]j'—R' f, is commercially available from DuPont under the trademark Krytox® In the formula, j' is 2-100, inclusive and R' f is CF2CF3, a C3 to C6 perfluoroalkyl group, or combinations thereof.

Other PFPEs, commercially available from Ausimont of Milan, Italy, under the trademarks Fomblin® and Galden®, and produced by perfluoroolefin photooxidation, can also be used. PFPE commercially available under the trademark Fomblin®-Y can have the formula of CF3O(CF2CF(CF3)-O—)m'(CF2-O—)n'—R1f. Also suitable is CF3O[CF2CF(CF3)-O]m'(CF2CF2O)o'(CF2O)n'—R1f. In the formulae R1f is CF3, C2F5, C3F7, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of CF3O(CF2CF2-O—)p'(CF2-O)q'CF3 where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F—[(CF2)3-O]t'—R2f where R2f is CF3, C2F5, or combinations thereof and t' is 2-200, inclusive.

The two end groups of the perfluoropolyether, independently, can be functionalized or unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be O—(CF(CF_3)CF_2—O)$_{w'}$, O—(CF_2—O)$_{x'}$ (CF_2CF_2—O)$_{y'}$, O—(C_2F_4—O)$_{w'}$, O—(C_2F_4—O)$_{x'}$(C_3F_6—O)$_{y'}$, O—(CF(CF_3)CF_2—O)$_{x'}$(CF_2—O)$_{y'}$, O—(CF_2CF_2CF_2—O)$_{w'}$, O—(CF(CF3)CF2-O)x'(CF2CF2-O)y'-(CF_2—O)z', or combinations of two or more thereof; preferably A is O—(CF(CF3)CF2-O)w', O—(C2F4-O)w', O—(C2F4-O)x'(C3F6-O)y', O—(CF2CF2CF2-O)w', or combinations of two or more thereof; w' is 4 to 100; x' and y' are each independently 1 to 100. Specific examples include, but are not limited to, F(CF(CF3)-CF2-O)9-CF2CF3, F(CF(CF3)-CF2-O)9-CF(CF3)2, and combinations thereof. In such PFPEs, up to 30% of the halogen atoms can be halogens other than fluorine, such as, for example, chlorine atoms.

The two end groups of the perfluoropolyether, independently, can also be functionalized. A typical functionalized end group can be selected from the group consisting of esters, hydroxyls, amines, amides, cyanos, carboxylic acids and sulfonic acids.

Representative ester end groups include —COOCH_3, —COOCH_2CH_3, —CF_2COOCH_3, —CF_2COOCH_2CH_3, —CF_2CF_2COOCH_3, —CF_2CF_2COOCH_2CH_3, —CF_2CH_2COOCH_3, —CF_2CF_2CH_2COOCH_3, —CF_2CH_2CH_2COOCH_3, —CF_2CF_2CH_2CH_2COOCH_3.

Representative hydroxyl end groups include —CF_2OH, —CF_2CF_2OH, —CF_2CH_2OH, —CF_2CF_2CH_2OH, —CF_2CH_2CH_2OH, —CF_2CF_2CH_2CH_2OH.

Representative amine end groups include —CF_2NR^1R^2, —CF_2CF_2NR^1R^2, —CF_2CH_2NR^1R^2, —CF_2CF_2CH_2NR^1R^2, —CF_2CH_2CH_2NR^1R^2, —CF_2CF_2CH_2CH_2NR^1R^2, wherein $R^1$ and $R^2$ are independently H, CH_3, or CH_2CH_3.

Representative amide end groups include —CF_2C(O)NR^1R^2, —CF_2CF_2C(O)NR^1R^2, —CF_2CH_2C(O)NR^1R^2, —CF_2CF_2CH_2C(O)NR^1R^2, —CF_2CH_2CH_2C(O)NR^1R^2, —CF_2CF_2CH_2CH_2C(O)NR^1R^2, wherein $R^1$ and $R^2$ are independently H, CH_3, or CH_2CH_3.

Representative cyano end groups include —CF_2CN, —CF_2CF_2CN, —CF_2CH_2CN, —CF_2CF_2CH_2CN, —CF_2CH_2CH_2CN, —CF_2CF_2CH_2CH_2CN.

Representative carboxylic acid end groups include —CF_2COOH, —CF_2CF_2COOH, —CF_2CH_2COOH, —CF_2CF_2CH_2COOH, —CF_2CH_2CH_2COOH, —CF_2CF_2CH_2CH_2COOH.

Representative sulfonic acid end groups include —S(O)(O)OR^3, —S(O)(O)R^4, —CF_2O S(O)(O)OR^3, —CF_2CF_2O S(O)(O)OR^3, —CF_2CH_2O S(O)(O)OR^3, —CF_2CF_2CH_2O S(O)(O)OR^3, —CF_2CH_2CH_2O S(O)(O)OR^3, —CF_2CF_2CH_2CH_2O S(O)(O)OR^3, —CF_2S(O)(O)OR^3, —CF_2CF_2S(O)(O)OR^3, —CF_2CH_2S(O)(O)OR^3, —CF_2CF_2CH_2S(O)(O)OR^3, —CF_2CH_2CH_2S(O)(O)OR^3, —CF_2CF_2CH_2CH_2S(O)(O)OR^3, —CF_2O S(O)(O)R^4, —CF_2CF_2O S(O)(O)R^4, —CF_2CH_2O S(O)(O)R^4, —CF_2CF_2CH_2O S(O)(O)R^4, —CF_2CH_2CH_2O S(O)(O)R^4, —CF_2CF_2CH_2CH_2O S(O)(O)R^4, wherein $R^3$ is H, CH_3, CH_2CH_3, CH_2CF_3, CF_3, or CF_2CF_3, $R^4$ is CH_3, CH_2CH_3, CH_2CF_3, CF_3, or CF_2CF_3, $R^4$ is CH_3, CH_2CH_3, CH_2CF_3, CF_3, or CF_2CF_3.

Apparatus

In one embodiment is provided an air conditioning or refrigeration apparatus containing a composition comprising cis-HFO-1336mzz and trans-1,2-DCE. Such an apparatus may be a closed loop heat transfer system, such as that disclosed in US Patent Publication No. US 2008/0314073, published Dec. 25, 2008.

Chillers

In one embodiment of the present invention is provided a chiller apparatus containing a composition comprising 1,1,1,4,4,4-hexafluoro-2-butene and 1,2-dichloroethylene, wherein the 1,1,1,4,4,4-hexafluoro-2-butene is cis isomer or primarily cis isomer and wherein the 1,2-dichloroethylene is trans isomer or primarily trans.

Figure 2:
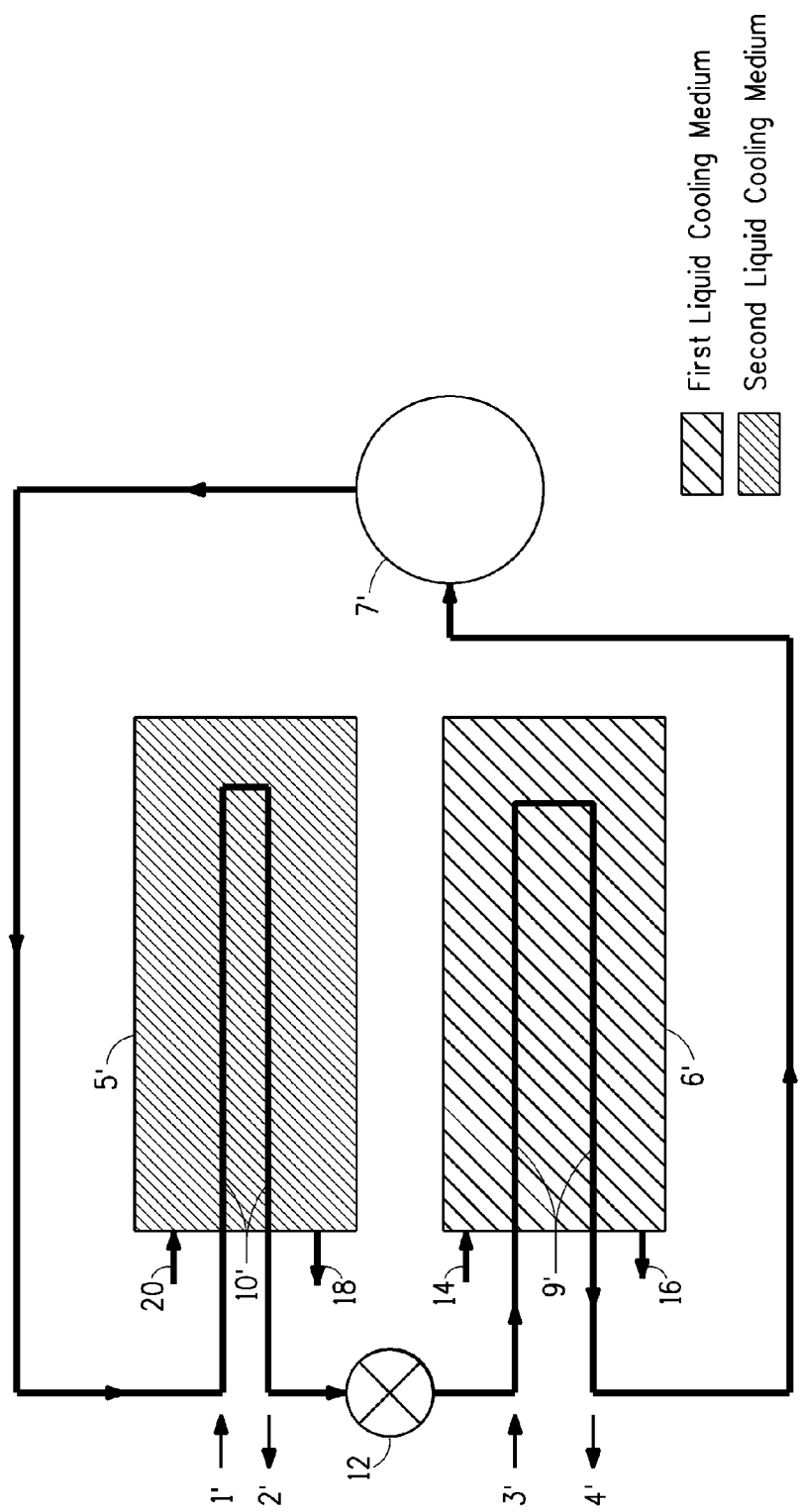
FIG. 2 is a schematic diagram of one embodiment of a direct expansion chiller which utilizes a composition comprising cis-1,1,1,4,4,4-hexafluoro-2-butene and trans-1,2-dichloroethylene.

In one embodiment the air conditioning or refrigeration apparatus containing a composition comprising cis-HFO-1336mzz and trans-1,2-DCE is a chiller. A chiller is a type of air conditioning/refrigeration apparatus. The present disclosure is directed to a vapor compression chiller. Such vapor compression chillers may be either flooded evaporator chillers, one embodiment of which is shown in FIG. 1, or direct expansion chillers, one embodiment of which is shown in FIG. 2. Both a flooded evaporator chiller and a direct expansion chiller may be air-cooled or water-cooled. In the embodiment where chillers are water cooled, such chillers are generally associated with cooling towers for heat rejection from the system. In the embodiment where chillers are air-cooled, the chillers are equipped with refrigerant-to-air finned-tube condenser coils and fans to reject heat from the system. Air-cooled chiller systems are generally less costly than equivalent-capacity water-cooled chiller systems including cooling tower and water pump. However, water-cooled systems can be more efficient under many operating conditions due to lower condensing temperatures.

Chillers, including both flooded evaporator and direct expansion chillers, may be coupled with an air handling and distribution system to provide comfort air conditioning (cooling and dehumidifying the air) to large commercial buildings, including hotels, office buildings, hospitals, universities and the like. In another embodiment, chillers, most likely air-cooled direct expansion chillers, have found additional utility in naval submarines and surface vessels.

To illustrate how chillers operate, reference is made to the Figures. A water-cooled, flooded evaporator chiller is shown illustrated in FIG. 1. In this chiller a first cooling medium, which is a warm liquid, which comprises water, and, in some embodiments, additives, such as a glycol (e.g., ethylene glycol or propylene glycol), enters the chiller from a cooling system, such as a building cooling system, shown entering at arrow 3, through a coil 9, in an evaporator 6, which has an inlet and an outlet. The warm first cooling medium is delivered to the evaporator, where it is cooled by liquid refrigerant, which is shown in the lower portion of the evaporator. The liquid refrigerant evaporates at a lower temperature than the warm first cooling medium which flows through coil 9. The cooled first cooling medium re-circulates back to the building cooling system, as shown by arrow 4, via a return portion of coil 9. The liquid refrigerant, shown in the lower portion of evaporator 6 in FIG. 1, vaporizes and is drawn into a compressor 7, which increases the pressure and temperature of the refrigerant vapor. The compressor compresses this vapor so that it may be condensed in a condenser 5 at a higher pressure and temperature than the pressure and temperature of the refrigerant vapor when it comes out of the evaporator. A second cooling medium, which is a liquid in the case of a water-cooled chiller, enters the condenser via a coil 10 in condenser 5 from a cooling tower at arrow 1 in FIG. 1. The second cooling medium is warmed in the process and returned via a return loop of coil 10 and arrow 2 to a cooling tower or to the environment. This second cooling medium cools the vapor in the condenser and causes the vapor to condense to liquid refrigerant, so that there is liquid refrigerant in the lower portion of the condenser as shown in FIG. 1. The condensed liquid refrigerant in the condenser flows back to the evaporator through an expansion device 8, which may be an orifice, capillary tube or expansion valve. Expansion device 8 reduces the pressure of the liquid refrigerant, and converts the liquid refrigerant partially to vapor, that is to say that the liquid refrigerant flashes as pressure drops between the condenser and the evaporator. Flashing cools the refrigerant, i.e., both the liquid refrigerant and the refrigerant vapor to the saturated temperature at evaporator pressure, so that both liquid refrigerant and refrigerant vapor are present in the evaporator.

It should be noted that for a single component refrigerant composition, the composition of the vapor refrigerant in the evaporator is the same as the composition of the liquid refrigerant in the evaporator. In this case, evaporation will occur at a constant temperature. However, if a refrigerant blend (or mixture) is used, as in the present invention, the liquid refrigerant and the refrigerant vapor in the evaporator (or in the condenser) may have different compositions. This may lead to inefficient systems and difficulties in servicing the equipment, thus a single component refrigerant is more desirable. An azeotrope or azeotrope-like composition will function essentially as a single component refrigerant in a chiller, such that the liquid composition and the vapor composition are essentially the same reducing any inefficiencies that might arise from the use of a non-azeotropic or non-azeotrope-like composition.

Chillers with cooling capacities above 700 kW generally employ flooded evaporators, where the refrigerant in the evaporator and the condenser surrounds a coil or other conduit for the cooling medium (i.e., the refrigerant is on the shell side). Flooded evaporators require higher charges of refrigerant, but permit closer approach temperatures and higher efficiencies. Chillers with capacities below 700 kW commonly employ evaporators with refrigerant flowing inside the tubes and cooling medium in the evaporator and the condenser surrounding the tubes, i.e., the cooling medium is on the shell side. Such chillers are called direct-expansion (DX) chillers. One embodiment of a water-cooled direct expansion chiller is illustrated in FIG. 2. In the chiller as illustrated in FIG. 2, first liquid cooling medium, which is a warm liquid, such as warm water, enters an evaporator 6' at inlet 14. Mostly liquid refrigerant (with a small amount of refrigerant vapor) enters a coil 9' in the evaporator at arrow 3' and evaporates, turning to vapor. As a result, first liquid cooling medium is cooled in the evaporator, and a cooled first liquid cooling medium exits the evaporator at outlet 16, and is sent to a body to be cooled, such as a building. In this embodiment of FIG. 2, it is this cooled first liquid cooling medium that cools the building or other body to be cooled. The refrigerant vapor exits the evaporator at arrow 4' and is sent to a compressor 7', where it is compressed and exits as high temperature, high pressure refrigerant vapor. This refrigerant vapor enters a condenser 5' through a condenser coil 10' at 1'. The refrigerant vapor is cooled by a second liquid cooling medium, such as water, in the condenser and becomes a liquid. The second liquid cooling medium enters the condenser through a condenser cooling medium inlet 20. The second liquid cooling medium extracts heat from the condensing refrigerant vapor, which becomes liquid refrigerant, and this warms the second liquid cooling medium in the condenser. The second liquid cooling medium exits through the condenser through the condenser cooling medium outlet 18. The condensed refrigerant liquid exits the condenser through lower coil 10' as shown in FIG. 2 and flows through an expansion device 12, which may be an orifice, capillary tube or expansion valve. Expansion device 12 reduces the pressure of the liquid refrigerant. A small amount of vapor, produced as a result of the expansion, enters the evaporator with liquid refrigerant through coil 9' and the cycle repeats.

Vapor-compression chillers may be identified by the type of compressor they employ. In one embodiment, the composition comprising cis-HFO-1336mzz and trans-1,2-DCE is useful in a chiller which utilizes a centrifugal compressor, hereinafter referred to as a centrifugal chiller, as will be described below.

In one embodiment is provided a centrifugal chiller containing a composition comprising cis-1,1,1,4,4,4-hexafluoro-2-butene and trans-1,2-dichloroethylene. A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The capacity of the centrifugal compressor is determined by the size of the passages through the impeller. This makes the size of the compressor more dependent on the pressure required than the capacity.

Methods

In one embodiment, a method for producing cooling comprises evaporating a composition comprising cis-HFO-1336mzz and trans-1,2-DCE in an evaporator in the vicinity of a body to be cooled, thereby producing cooling. The method to produce cooling may further comprise compressing said composition comprising cis-HFO-1336mzz and trans-1,2-DCE in a centrifugal compressor and thereafter condensing said composition comprising cis-HFO-1336mzz and trans-1,2-DCE in a condenser.

In one embodiment, a body to be cooled may be any space, object or fluid that may be cooled. In one embodiment, a body to be cooled may be a room, building, passenger compartment of an automobile, refrigerator, freezer, or supermarket or convenience store display case. Alternatively, in another embodiment, a body to be cooled may be a cooling medium or heat transfer fluid.

In one embodiment, the method for producing cooling comprises producing cooling in a flooded evaporator chiller as described above with respect to FIG. 1. In this method, the composition comprising cis-HFO-1336mzz and trans-1,2-DCE is evaporated to form a refrigerant vapor in the vicinity of a first cooling medium. The cooling medium is a warm liquid, such as water, which is transported into the evaporator via a pipe from a cooling system. The warm liquid is cooled and is passed to a body to be cooled, such as a building. The refrigerant vapor is then condensed in the vicinity of a second cooling medium, which is a chilled liquid which is brought in from, for instance, a cooling tower. The second cooling medium cools the refrigerant vapor such that it is condensed to form a liquid refrigerant. In this method, a flooded evaporator chiller may also be used to cool hotels, office buildings, hospitals and universities.

In another embodiment, the method for producing cooling comprises producing cooling in a direct expansion chiller as described above with respect to FIG. 2. In this method, the composition comprising cis-HFO-1336mzz and trans-1,2-DCE is passed through an evaporator and evaporates to produce a refrigerant vapor. A first liquid cooling medium is cooled by the evaporating refrigerant. The first liquid cooling medium is passed out of the evaporator to a body to be cooled. In this method, the direct expansion chiller may also be used to cool hotels, office buildings, hospitals, universities, as well as naval submarines or naval surface vessels.

In either method for producing cooling in either a flooded evaporator chiller or in direct expansion chiller, the chiller includes a compressor which is a centrifugal compressor.

In another embodiment, disclosed is a method for replacing HCFC-123 or CFC-11 refrigerant in a chiller, said method comprising providing a composition comprising 1,1,1,4,4,4-hexafluoro-2-butene and 1,2-dichloroethylene to said chiller in place of said refrigerant, wherein the 1,1,1,4,4,4-hexafluoro-2-butene is cis isomer or primarily cis isomer and wherein the 1,2-dichloroethylene is trans isomer or primarily trans isomer.

Refrigerants and heat transfer fluids that are in need of replacement, based upon GWP calculations published by the Intergovernmental Panel on Climate Change (IPCC), include but are not limited to HCFC-123. Therefore, in accordance with the present invention, there is provided a method for replacing HCFC-123 refrigerant in a chiller. The method comprises providing a composition comprising 1,1,1,4,4,4-hexafluoro-2-butene and 1,2-dichloroethylene to said chiller in place of said refrigerant, wherein the 1,1,1,4,4,4-hexafluoro-2-butene is cis isomer or primarily cis isomer and wherein the 1,2-dichloroethylene is trans isomer or primarily trans isomer. The chiller of the present method may be a flooded evaporator chiller or a direct expansion chiller.

In this method of replacing HCFC-123, the composition comprising cis-HFO-1336mzz and trans-1,2-DCE is useful in centrifugal chillers that may have been originally designed and manufactured to operate with HCFC-123.

In one embodiment, the method of replacing HCFC-123 further comprises increasing the rotational speed of the impeller of the centrifugal compressor in order to better match the cooling capacity achieved with the HCFC-123 refrigerant.

Alternatively, in another embodiment, the method of replacing HCFC-123 further comprises replacing the centrifugal compressor impeller with an impeller of larger diameter in order to better match the cooling capacity achieved with the HCFC-123 refrigerant.

Another refrigerant in need of replacement due to ODP (ODP=1) and GWP (GWP=4750) is CFC-11. HCFC-123 was originally used in chillers as a replacement for CFC-11, because the performance of HCFC-123 closely matches that of CFC-11. But CFC-11 may still be in use in certain areas of the world. Therefore, in accordance with the present invention, there is provided a method for replacing CFC-11 refrigerant in a chiller. The method comprises providing a composition comprising 1,1,1,4,4,4-hexafluoro-2-butene and 1,2-dichloroethylene to said chiller in place of said refrigerant, wherein the 1,1,1,4,4,4-hexafluoro-2-butene is cis isomer or primarily cis isomer and wherein the 1,2-dichloroethylene is trans isomer or primarily trans isomer. The chiller of the present method may be a flooded evaporator chiller or a direct expansion chiller. The performance of the compositions of the present invention relative to CFC-11 will be expected to be similar as compared to HCFC-123.

In this method of replacing CFC-11, the composition comprising cis-HFO-1336mzz and trans-1,2-DCE is useful in centrifugal chillers that may have been originally designed and manufactured to operate with CFC-11.

In one embodiment, the method of replacing CFC-11 further comprises increasing the rotational speed of the centrifugal compressor impeller in order to better match the cooling capacity achieved with the CFC-11 refrigerant.

Alternatively, in another embodiment, the method of replacing CFC-11 further comprises replacing the centrifugal compressor impeller with an impeller of larger diameter in order to better match the cooling capacity achieved with the CFC-11 refrigerant.

In replacing HCFC-123 or CFC-11 in existing equipment, additional advantages may be realized by making adjustments to equipment or operating conditions or both. For example, impeller diameter and impeller speed may be adjusted in a centrifugal chiller where a composition cis-HFO-1336mzz is being used as a replacement refrigerant.

Alternatively, in this method of replacing HCFC-123 or CFC-11, the composition comprising cis-HFO1336mzz and trans-1,2-DCE as disclosed herein may be useful in new equipment, such as a new flooded evaporator chiller or a new direct expansion chiller. In such new equipment, a centrifugal compressor and the evaporators and condensers used therewith, may be used.

EXAMPLES

Example 1

Cooling Performance for Compositions Comprising cis-HFO-1336mzz and trans-1,2-DCE in a Centrifugal Chiller The performance of compositions containing cis-HFO-1336mzz and trans-1,2-dichloroethylene in a centrifugal chiller is determined and compared to performance for HCFC-123. The data are shown in Table 1. The data are based on the following conditions:

| | |
|---|---|
| Evaporator temperature* | 4.4° C. |
| Condenser temperature* | 37.8° C. |
| Compressor efficiency | 70% |

Note that these values are averages for the composition at 58 wt % cis-HFO-1336mzz.

TABLE 1

| | HCFC-123 | Cis-1336mzz/trans-1,2-DCE (58/42 wt %) | 58/42 relative to HCFC-123 (%) | Cis-1336mzz/trans-1,2-DCE (74.7/25.3 wt %) | 74.7/25.3 relative to HCFC-123 (%) |
|---|---|---|---|---|---|
| Evaporator pressure (kPa) | 39.8 | 33.6 | 84.4 | 37.1 | 93.2 |
| Condenser pressure (kPa) | 143.9 | 127.0 | 88.2 | 136.2 | 94.6 |
| COP | 5.15 | 5.12 | 99.5 | 5.16 | 100.2 |
| Volumetric Capacity (kJ/m$^3$) | 392.7 | 343.8 | 87.6 | 370.6 | 94.4 |
| Compressor impeller tip speed (m/s) | 168.6 | 189.7 | 112.5 | 177.3 | 105.2 |
| GWP | 77* | ~<10 | | ~<10 | |
| ODP | 0.02** | ~<0.005 | | ~<0.005 | |

*GWP value for HCFC-123 at 100 year time horizon as reported in the IPCC Fourth Assessment Report (2007). GWP value for cis-HFO-1336mzz estimated from atmospheric lifetime predictions.
**ODP value for HCFC-123 is reported in the "The Scientific Assessment of Ozone Depletion, 2002, A report of the World Meteorological Association's Global Ozone Research and Monitoring Project," page 1.30, Table 1-5 as determined with updated lifetimes (see footnote b).

The GWP and ODP values for the compositions of the present invention (58/42 wt % and 74.7/25.3 wt % cis-1336mzz/trans-1,2-DCE) are estimated from available data for atmospheric lifetime predictions for cis-HFO1336mzz.

The data in Table 1 indicate that compositions comprising cis-HFO-1336mzz and trans-1,2-dichloroethylene with greater than 50 weight percent cis-HFO-1336mzz can provide surprisingly similar energy efficiency (COP) and volumetric cooling capacity to HCFC-123. They also require surprisingly comparable impeller tip speeds to lift the refrigerant from evaporator to condenser conditions. The performance of the 74.7/25.3 blend, in particular, is remarkably close to that of HCFC-123. As a result, the cost and risk in developing new chillers designs, optimized for the new refrigerant blend, is reduced. The evaporator and condenser pressures generated by the compositions in Table 1 containing cis-HFO-1336mzz are lower than those generated by HCFC-123. Therefore, chiller equipment designed to withstand the pressures generated by HCFC-123 would be adequate for use with the compositions in Table 1 containing cis-HFO-1336mzz.

In one retrofit scenario of an existing HCFC-123 chiller, the HCFC-123 refrigerant would be replaced by the new refrigerant blend containing 74.7 wt % cis-HFO1336mzz, but the compressor impeller would be retained. In this scenario, a small (5.2%) increase in the rotational speed of the impeller would generate the slightly higher tip speed required to lift the new refrigerant from evaporator to condenser conditions and the slightly higher refrigerant volumetric flow rate required to restore the nominal cooling capacity of the chiller. The compressor efficiency at the new set of operating conditions would not deviate substantially from the compressor efficiency prior to the retrofit. Assuming that the compressor operated at maximum efficiency prior to the retrofit, only a small efficiency loss would have to be accepted in return for the benefits of the new refrigerant at a minimal conversion cost.

Example 2

Flammability Testing

The non-flammable range for compositions comprising cis-HFO-1336mzz and trans-1,2-dichloroethylene was determined according to the ASTM E681-2001 test procedure as required in ASHRAE Standard 34-2007 and described in Addendum p to ASHRAE Standard 34-2007. Test conditions were 100° C., with 50% relative humidity as prepared at 23° C. Results are given in Table 2.

TABLE 2

| Composition | LFL (vol % in air) | UFL (vol % in air) |
|---|---|---|
| cis-1336mzz/trans-1,2-DCE (50/50 wt %) | 8.0 | 11.0 |
| cis-1336mzz/trans-1,2-DCE (55/45 wt %) | 8.0 | 9.5 |
| cis-1336mzz/trans-1,2-DCE (57.5/42.5 wt %) | 9.0 | 9.0 |

These test results indicate that any composition comprising cis-HFO-1336mzz and trans-1,2-DCE with greater than 57.5 weight percent cis-HFO-1336mzz (at which point the LFL and UFL are the same value) will be non-flammable at 100° C.

Example 3

Flammability Testing

A composition containing 50 weight percent cis-HFO-1336mzz and 50 weight percent trans-1,2-DCE was tested as described in Example 2, but at a temperature of 60° C. and was found to be flammable, with both an LFL and UFL of 9.0 volume percent in air. Therefore at 60° C., the flammability limit for this composition is 50 weight percent cis-HFO-1336mzz and compositions comprising cis-HFO-1336mzz and trans-1,2-DCE with greater than 50 weight percent cis-HFO-1336mzz will be non-flammable.

Example 4

Comparative

Cooling Performance for cis-HFO-1336mzz in a Centrifugal Chiller

The performance for cis-HFO-1336mzz in a centrifugal chiller is determined and compared to performance for HCFC-123. The data are shown in Table 1. The data are based on the following conditions:

| | |
|---|---|
| Evaporator temperature* | 4.4° C. |
| Condenser temperature* | 37.8° C. |
| Compressor efficiency | 70% |

Note that these values are averages for the composition at 58 wt % cis-HFO-1336mzz.

TABLE 3

| | HCFC-123 | cis-HFO-1336mzz | cis-HFO-1336mz Relative to HCFC-123 (%) |
|---|---|---|---|
| Cooling rate (kJ/s) | 3,517 | 3,517 | 100 |
| COP | 7.36 | 7.26 | 98.6 |
| Volumetric Capacity (kJ/m$^3$) | 394 | 311 | 78.9 |
| Compressor impeller tip speed (m/s) | 190 | 187 | 98.4 |
| Impeller diameter (m) | 0.762 | 0.864 | 113.4 |
| GWP* | 77 | <10 | |
| ODP** | 0.02 | 0 | |

*GWP value for HCFC-123 at 100 year time horizon as reported in the IPCC Fourth Assessment Report (2007). GWP value for cis-HFO-1336mzz estimated from atmospheric lifetime predictions.
**ODP value for HCFC-123 is reported in the "The Scientific Assessment of Ozone Depletion, 2002, A report of the World Meteorological Association's Global Ozone Research and Monitoring Project," page 1.30, Table 1-5 as determined with updated lifetimes (see footnote b).

Comparing the data in Table 3 to the data in Table 1 indicates that the blends of this invention can be more effectively used as a replacement for HCFC-123 than the cis-HFO-1336mzz alone.

What is claimed is:

1. A chiller apparatus containing a composition consisting of cis-1,1,1,4,4,4-hexafluoro-2-butene and trans-1,2-dichloroethylene; wherein said chiller comprises a centrifugal compressor and is suitable for use with HCFC-123; and wherein said composition consists of from about 67 weight percent to about 87 weight percent cis-1,1,1,4,4,4-hexafluoro-2-butene and from about 33 weight percent to about 13 weight percent trans-1,2-dichloroethylene.

2. The chiller apparatus of claim 1 wherein said chiller is a flooded evaporator chiller.

3. The chiller apparatus of claim 1 wherein said chiller is a direct expansion chiller.

4. The apparatus of claim 1, wherein the centrifugal compressor comprises an impeller and the impeller tip speed is within 10% of that for HCFC-123.

5. The apparatus of claim 4, wherein the impeller tip speed is within 5% of that for HCFC-123.

6. The apparatus of claim 4, wherein the composition is non-flammable, provides cooling capacity in said chiller within 10% of the cooling capacity for HCFC-123, and an average temperature glide of less than 1 K.

7. The apparatus of claim 1, wherein the composition provides cooling capacity in said chiller within 10% of the cooling capacity for HCFC-123.

8. A method for producing cooling comprising evaporating a composition comprising cis-1,1,1,4,4,4-hexafluoro-2-butene and trans-1,2-dichloroethylene in an evaporator in the vicinity of a body to be cooled, thereby producing cooling; wherein said cooling is produced by a chiller having a centrifugal compressor and said chiller is suitable for use with HCFC-123; and wherein said composition consists of from about 67 weight percent to about 87 weight percent cis-1,1,1,4,4,4-hexafluoro-2-butene and from about 33 weight percent to about 13 weight percent trans-1,2-dichloroethylene.

9. The method of claim 8, further comprising the step of passing a cooling medium through the evaporator, wherein the evaporation step cools the cooling medium, and passing the cooling medium out of the evaporator to the body to be cooled.

10. A method for replacing HCFC-123 or CFC-11 refrigerant in a chiller, said method comprising providing a composition consisting of cis-1,1,1,4,4,4-hexafluoro-2-butene and trans-1,2-dichloroethylene to said chiller in place of said refrigerant; wherein said chiller comprises a centrifugal compressor; and wherein said composition consists of from about 67 weight percent to about 87 weight percent cis-1,1,1,4,4,4-hexafluoro-2-butene and from about 33 weight percent to about 13 weight percent trans-1,2-dichloroethylene.

11. The method of claim 10, wherein the centrifugal compressor has an impeller, and said method further comprises increasing the rotational speed of the impeller.

12. The method of claim 10, wherein the centrifugal compressor has an impeller, and said method further comprises replacing the compressor impeller with a larger diameter impeller.

13. A chiller apparatus containing a composition consisting of cis-1,1,1,4,4,4-hexafluoro-2-butene and trans-1,2-dichloroethylene; wherein said chiller comprises a centrifugal compressor and is suitable for use with HCFC-123; and wherein said composition consists of about 74.7 weight percent cis-1,1,1,4,4,4-hexafluoro-2-butene and about 25.3 weight percent trans-1,2-dichloroethylene.

14. A method for producing cooling comprising evaporating a composition comprising cis-1,1,1,4,4,4-hexafluoro-2-butene and trans-1,2-dichloroethylene in an evaporator in the vicinity of a body to be cooled, thereby producing cooling; wherein said cooling is produced by a chiller having a centrifugal compressor and said chiller is suitable for use with HCFC-123; and wherein said composition consists of about 74.7 weight percent cis-1,1,1,4,4,4-hexafluoro-2-butene and about 25.3 weight percent trans-1,2-dichloroethylene.

15. A method for replacing HCFC-123 or CFC-11 refrigerant in a chiller, said method comprising providing a composition consisting of cis-1,1,1,4,4,4-hexafluoro-2-butene and trans-1,2-dichloroethylene to said chiller in place of said refrigerant; wherein said chiller comprises a centrifugal compressor; and wherein said composition consists of about 74.7 weight percent cis-1,1,1,4,4,4-hexafluoro-2-butene and about 25.3 weight percent trans-1,2-dichloroethylene.

* * * * *